No. 703,279. Patented June 24, 1902.
J. M. KINNARD.
MEASURING CABINET.
(Application filed Jan. 24, 1902.)
(No Model.) 2 Sheets—Sheet 1.
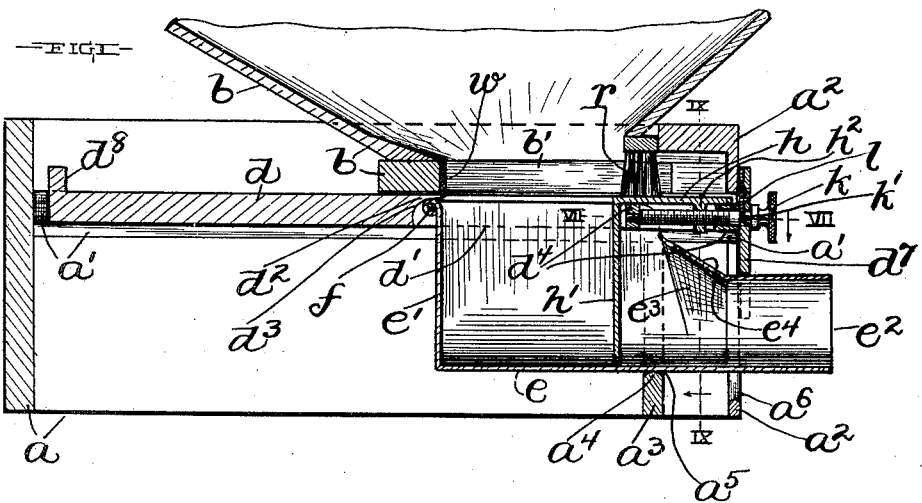
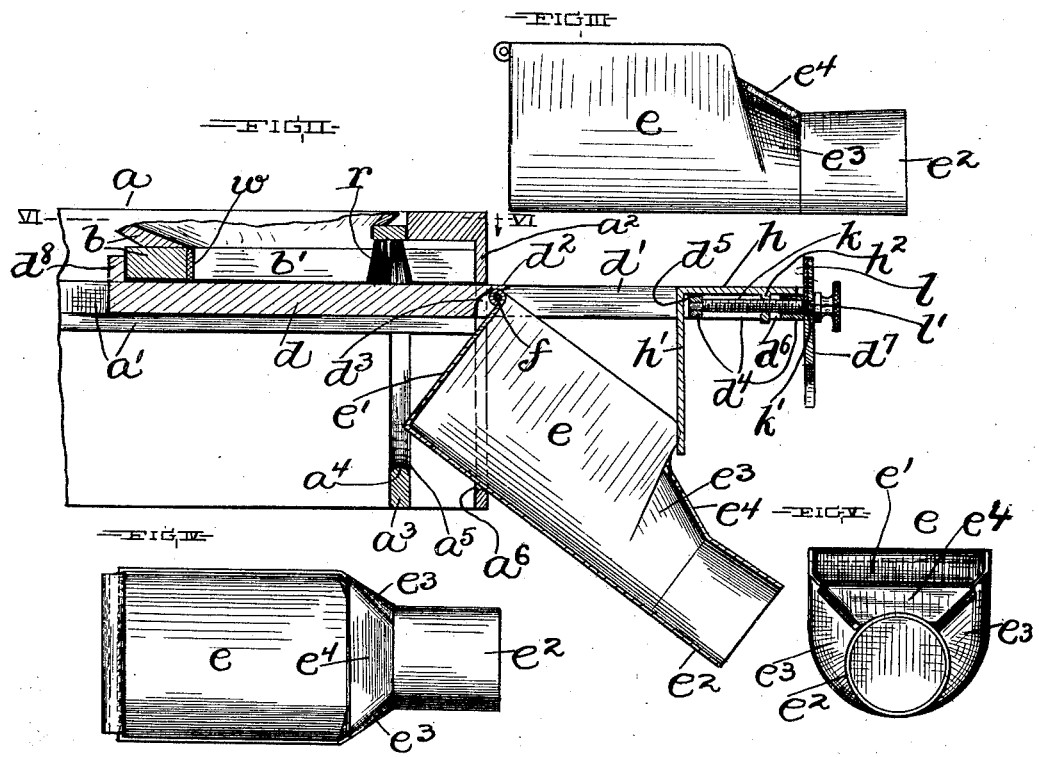

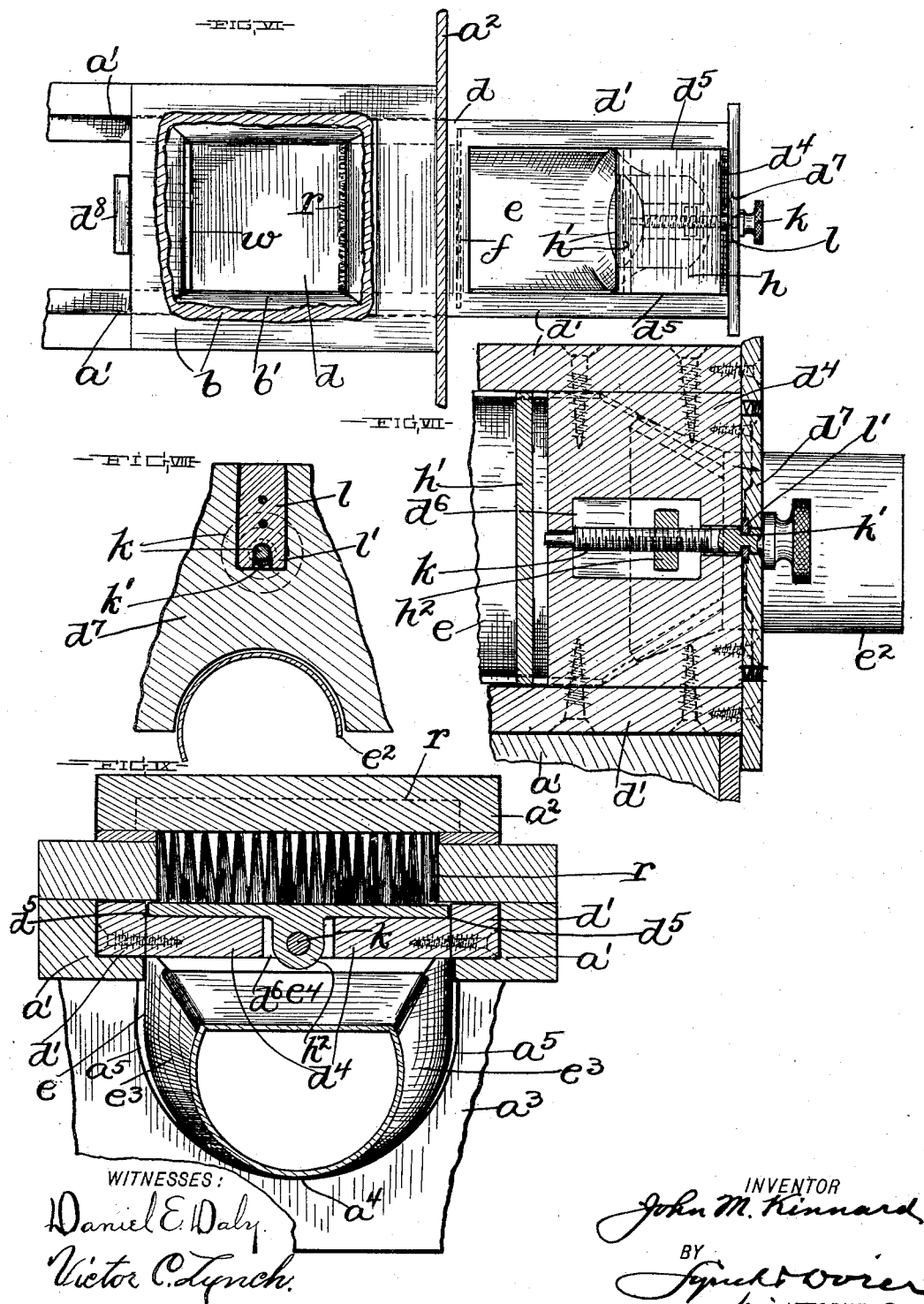

UNITED STATES PATENT OFFICE.

JOHN M. KINNARD, OF CLEVELAND, OHIO.

MEASURING-CABINET.

SPECIFICATION forming part of Letters Patent No. 703,279, dated June 24, 1902.

Application filed January 24, 1902. Serial No. 91,059. (No model.)

*To all whom it may concern:*

Be it known that I, JOHN M. KINNARD, a citizen of the United States of America, residing at Cleveland, in the county of Cuyahoga and State of Ohio, have invented certain new and useful Improvements in Measuring-Cabinets; and I hereby declare the following to be a full, clear, and exact description of the invention, such as will enable others skilled in the art to which it pertains to make and use the same.

My invention relates to improvements in measuring caddies or cabinets, more especially designed for use in measuring dry merchandise—such, for instance, as coffee, tea, rice, barley, &c.

The object of this invention is to provide a machine or apparatus of the character indicated which is simple in construction and reliable and convenient in its operation; and with this general object in view, and more especially to provide improved gage mechanism for regulating the capacity of the measuring-scoop of the machine and to improve the form and construction of the said scoop and to the end of realizing other advantages hereinafter appearing, my present invention consists in certain features of construction and combinations of parts hereinafter described, and pointed out in the claims.

In the accompanying drawings, Figure I is a left-hand side elevation, largely in central section, of a measuring caddy or cabinet embodying my invention, and in this figure the measuring-scoop of the machine is shown in its inner or normal and merchandise-receiving position. Fig. II is a left-hand side elevation, largely in central section, of a portion of the cabinet; but in this figure the measuring-scoop is shown in its outer and merchandise-discharging position. Fig. III is a side elevation of the scoop detached. Fig. IV is a top plan of the scoop. Fig. V is an outer end view of the scoop. Fig. VI is a top plan of a portion of the cabinet in section on line VI VI, Fig. II. Fig. VII is a top plan, largely in section, on line VII VII, Fig. I, of a portion of the cabinet. Fig. VIII is a vertical section on line VIII VIII, Fig. VII, looking outwardly. Fig. IX is a front elevation in section on line IX IX, Fig. I. Figs. VII, VIII, and IX are drawn on a larger scale than the other figures.

Referring to the drawings, $a$ designates the inclosing case or stationary framework of the caddy or cabinet. At the top of the forward portion of the cabinet is arranged a hopper $b$, which is applied and supported in any approved manner. The hopper $b$ is provided at its lower end and a suitable distance from the front wall $a^2$ of the casing $a$ with a downwardly-discharging opening or outlet $b'$.

A slide $d$ is arranged to operate in a horizontal plane below and in close proximity to the outlet $b'$ of the hopper $b$. The slide $d$ forms a cut-off which is movable forwardly and rearwardly, as will hereinafter appear, and in the inner and normal position of the parts is arranged rearward of the outlet $b'$ of the hopper, as shown in Fig. I, and in its forward or outer position, as shown in Figs. II and III, closes the said outlet from below and prevents the gravitation of merchandise from within the hopper into the scoop $e$. The slide $d$ has two parallel arms $d'$ and $d'$, which project forwardly of the slide and are arranged a suitable distance apart laterally. The slide $d$ and its arms $d'$ engage corresponding slideways $a'$, which are formed by members rigid with the stationary framework or casing $a$, as shown in Figs. I, II, IV, and IX. The slideways $a'$ extend far enough forwardly and rearwardly to form an adequate support for the slide $d$ in any position of the slide.

The measuring-scoop $e$, adapted to receive the material discharged from the hopper $b$, has its rear or body portion open at the top and is arranged between and longitudinally of and extends below the slide-arms $d'$ and $d'$, and the arrangement of the parts is such that the said scoop when the slide $d$ is in its inner and normal position has its chamber in registry at the top with the outlet $b'$ of the hopper. The scoop $e$ is arranged, therefore, longitudinally of the path of the slide, has its rear end closed, as at $e'$, and is provided at its forward end with a tubular handle $e^2$. The scoop $e$ is shown detached in Figs. III, IV, and V. The scoop $e$ has its rear or inner end wall $e'$ bent at the top (see Figs. I and II) over and around a pivot-forming pin $f$, which is arranged horizontally and transversely of the scoop and supported from the slide $d$ below a knife or cutter $d^2$, which is formed by the upper portion of the forward or outer end of the slide $d$ by undercutting the said end, as at $d^3$, to accommodate the location of the pivotal bearing and the rear end of the scoop during the operation of the scoop, and the comparatively thin and knife-forming portion $d^2$ of the slide overhangs the said pivotal bearing and the said rear end wall of the scoop and is capable of severing any particles or pieces of merchandise depending from the hopper into the path of the slide $d$ when the said slide is actuated into its forward or outer position. The scoop $e$ is rounded at the bottom, and a bearing for the said scoop a short distance rearward of the front wall $a^2$ of the casing $a$ is provided and comprises, preferably, a cross-bar $a^3$, which extends transversely of and is rigid with the said casing and is arranged a short distance rearward of the front wall $a^2$ of the casing and is cut away centrally, as at $a^5$, to accommodate the location and movement of the scoop and to form a bearing, as at $a^4$, at the bottom of the hole $a^5$ for the under side of the scoop when the slide $d$, to which the scoop is pivotally attached, as already indicated, is in its inner and normal position, as shown in Fig. I. The scoop $e$ has the rear and body portion thereof considerably larger in size transversely of the scoop than its forward and handle-forming end $e^2$; but the bottom of the handle $e^2$ is preferably flush or approximately flush with the bottom of the rear and body portion of the scoop, and the side walls of the scoop diverge inwardly, as at $e^3$, from the inner end of the said handle, and the scoop is closed at the top, as at $e^4$, between the diverging portions $e^3$ of the side walls of the scoop, and the said top $e^4$ slopes upwardly toward the inner end of the scoop.

By the shape and construction of scoop herein described the passage of material from within the rear or body portion of the scoop to the handle $e^2$ is not only facilitated, but merchandise cannot escape from the scoop at the top of the handle $e^2$ or at the top of the scoop next rearward of the said handle, and merchandise can only be discharged or escape from the scoop through the said handle, and hence the liability of wasting merchandise is reduced to a minimum. It will be observed also that the scoop-handle $e^2$ constitutes the handle of the slide $d$, and the said slide is actuated outwardly in under the outlet $b'$ of the hopper or inwardly from in under the said outlet, according as the operative pulls outwardly or pushes inwardly upon the said handle.

The arrangement of parts is such that the scoop-handle $e^2$ extends through and a suitable distance forward of the front wall $a^2$ of the casing $a$, which wall is provided with a centrally-located hole $a^6$ for accommodating the location and operation of the scoop, and the said hole $a^6$ extends below the hole $a^5$ in the bar $a^3$, and the bottom of the said hole $a^6$ forms a bearing for the under side of the scoop $e$, as shown in Fig. II, when the said scoop has tilted downwardly by gravity, as it does when it and the connected slide $d$ are actuated into their forward or outer position.

The slide-arms $d'$ and $d'$ are connected together and braced apart at their forward ends by a cross-bar $d^4$, which is interposed between the said arms, and the said arms and the said cross-bar are secured together in any approved manner. The cross-bar is not quite as thick vertically as the arms $d'$ and is arranged with its upper side somewhat below the upper sides of the said arms, so that a slideway $d^5$ (see Fig. IX) is formed by the said parts $d'$ and $d^4$ for the gage-slide $h$, which is arranged in a horizontal plane and rests upon the said bar and is adjustable upon the said bar longitudinally of the scoop.

A gage $h'$ for regulating the capacity of the scoop $e$ is provided, and consists, preferably, of a partition-forming plate arranged uprightly within the forward portion of the body portion of the scoop and extending transversely of the scoop when the scoop is in registry with the outlet $b'$ of the hopper. The gage $h'$ and the slide $h$ are preferably integral, and the gage depends from the inner end of the slide. The gage $h'$ is adjustable with the slide $h$, therefore, longitudinally of the scoop, and the means for securing the said parts $h$ and $h'$ in the desired adjustment comprises, preferably, a screw $k$, which is arranged in a horizontal plane below and parallel with the path of the slide $h$, preferably centrally between the side edges of the said slide, and extends through and engages a correspondingly-threaded nut $h^2$, integral with and depending from the said slide. The cross-bar $d^4$ has a slot $d^6$ arranged to accommodate the location of the nut $h^2$ during a readjustment of the slide $h$, and the said screw $k$ has bearing in the end walls of the said slot. Means for preventing endwise shifting of the screw $k$ during the rotation of the screw is provided, so that the slide $h$ is actuated inwardly or outwardly, according as the screw is turned in the one direction or the other, and obviously the gage $h'$ is shifted toward or from the inner end wall of the scoop, according as the said slide is shifted inwardly or outwardly, and the capacity of the chamber of the scoop rearwardly of the gage $h'$ is enlarged or reduced, according as the said gage is shifted toward or from the inner end of the scoop. The screw $k$ extends forwardly through a cross-bar $d^7$, which is attached to the forward end of the slide-arms $d'$ and to the forward edge of the cross-bar $d^4$, and the means employed to prevent endwise shifting of the screw during the rotation of the said screw comprises, preferably, an annular groove $k'$, formed in the screw within the said bar $d^7$ and engaged by the lower forked end $l'$ of a metal plate $l$, which is set into and attached to the inner side of the said bar $d^7$. The bar $d^7$ preferably straddles the top of the scoop-handle $e^2$ and closes the opening $a^6$ at the top of the said handle when the scoop is in registry with the hopper.

Stops for limiting the movement of the slide $d$ are provided. The said slide is provided at its rear end with an upwardly-projecting member $d^8$, which in the extreme forward or outer position of the said slide engages the rear side of the outlet-forming portion or lower end of the hopper, and consequently the hopper and the said slide member $d^8$ form a stop for limiting the outward actuation of the slide. The bar $d^7$ overlaps and abuts against the outer side of the upper portion of the front wall $a^2$ of the casing $a$ in the inner and normal position of the slide $d$, and consequently the said wall and the said bar constitute a stop for preventing the actuation of the said slide inwardly beyond its normal position.

A brush $r$ is arranged at the forward side of the outlet $b'$ of the hopper in position to brush the upper surface of the slide or cut-off $d$ during the outward actuation of the said cut-off or slide.

A wiper $w$ is suitably attached to and extends along the rear wall of the outlet $b'$ of the hopper and is arranged to wipe the upper side of the slide $d$ and the knife $d^2$ during the return of the said slide from its outer position into its inner and normal position.

What I claim is—

1. A caddy or cabinet of the character indicated, comprising a hopper having a downwardly-discharging outlet; a suitably-supported movable slide having a path below and in close proximity to the said outlet, and a measuring-scoop arranged longitudinally of the path of the slide and closed at its inner end and pivoted, at the said end and at the top and transversely of the scoop, to the said slide, which scoop has the rear or body portion open at the top and larger transversely than its forward portion and has its forward portion in the form of a forwardly-projecting tubular handle which constitutes the outlet of the scoop and is arranged, at the bottom, flush or approximately flush with the bottom of the rear and body portion of the scoop.

2. A caddy or cabinet of the character indicated, comprising a hopper having a downwardly-discharging outlet; a suitably-supported movable slide having a path below and in close proximity to the said outlet and arranged to close the said outlet from below in its outer position; a measuring-scoop arranged longitudinally of the path of the slide and pivoted, at its inner end and at the top and transversely of the scoop, to the said slide; a bearing arranged to be engaged by the under side of the scoop when the slide is in its inner and normal position, and another bearing located forward of and below the first-mentioned bearing and arranged to be engaged by the said under side of the scoop when the scoop has tilted downwardly by gravity upon the actuation of the slide into its forward or outer position.

3. A caddy or cabinet of the character indicated, comprising a hopper having a downwardly-discharging outlet, a suitably-supported movable slide having a path below and in close proximity to the said outlet and arranged to close the said outlet from below in its outer position, and a measuring-scoop arranged longitudinally of the path of the slide and pivoted at its inner end and at the top and transversely of the scoop to the said slide, the inclosing casing having its front wall provided with a hole to accommodate the location and operation of the said scoop and the aforesaid slide, and a cross-bar arranged a suitable distance rearward of the said front wall and having a hole arranged to accommodate the location and operation of the scoop and the said slide, and the hole in the front wall of the casing extending below the hole in the said cross-bar, and the arrangement of parts being such that the scoop shall be in registry with the outlet of the hopper when the aforesaid slide is in its inner and normal position and rest upon the bottom of the hole in the said cross-bar, and shall tilt downwardly by gravity when the slide is actuated into its outer position and rest upon the bottom of the hole in the aforesaid front wall in the outer position of the slide.

4. In a caddy or cabinet of the character indicated, the combination, with a hopper having a downwardly-discharging outlet; a suitably-supported movable slide having a path in a horizontal plane below and in close proximity to the said outlet and arranged to close the said outlet from below in its outer position and having two forwardly-extending arms arranged apart laterally, and a measuring-scoop arranged longitudinally of the path of the slide and movable with the slide, of a slide supported from the outer ends of the aforesaid arms and adjustable toward and from the inner end of the scoop, a gage rigid with the said last-mentioned slide and arranged to regulate the capacity of the scoop, a screw arranged in a horizontal plane adjacent to the said gage-slide and longitudinally of the path of the scoop, means for preventing endwise shifting of the screw during the rotation of the screw, and a nut rigid with the gage-slide and engaged by the said screw.

5. In a caddy or cabinet of the character indicated, the combination, with a hopper having a downwardly-discharging outlet, a suitably-supported movable slide having a path in a horizontal plane below and in close proximity to the said outlet and arranged to close the said outlet from below in its outer position and having two forwardly-extending arms arranged a suitable distance apart laterally, a measuring-scoop arranged longitudinally of the path of the slide and movable with the slide, and a cross-bar arranged between the outer ends of and rigid with the aforesaid slide-arms and having its upper side somewhat below the upper sides of the said arms so as to form a slideway between the said ends of the said arms, of a slide resting upon the said cross-bar and extending between the aforesaid arms and adjustable toward and from the inner end of the scoop, a gage rigid with the said last-mentioned slide and arranged to regulate the capacity of the scoop, a screw arranged in a horizontal plane below the said gage-slide and longitudinally of the path of the scoop, means for preventing endwise shifting of the screw during the rotation of the screw, and a nut rigid with and depending from the gage-slide and engaged by the aforesaid screw, and the aforesaid cross-bar being slotted to accommodate the location and operation of the aforesaid nut.

6. In a caddy or cabinet of the character indicated, the combination, with a hopper having a downwardly-discharging outlet, a suitably-supported movable slide having a path in a horizontal plane below and in close proximity to the said outlet and arranged to close the said outlet from below in its outer position and having two forwardly-extending arms arranged a suitable distance apart laterally, and a measuring-scoop arranged longitudinally of the path of the slide and movable with the slide, of a slide supported from the said arms and adjustable toward and from the inner end of the scoop, a gage rigid with the said last-mentioned slide and arranged to regulate the capacity of the scoop, a screw arranged longitudinally of the path of the said gage-slide and provided with an annular groove, a nut rigid with the gage-slide and engaged by the aforesaid screw, a cross-bar extending between the outer ends of and rigid with the aforesaid slide-arms, and a plate attached to the said cross-bar and engaging the aforesaid groove.

In testimony whereof I sign the foregoing specification, in the presence of two witnesses, this 21st day of January, 1902, at Cleveland, Ohio.

JOHN M. KINNARD.

Witnesses:
C. H. DORER,
TELSA SCHWARTZ.